UNITED STATES PATENT OFFICE.

ALEXANDER HAMBURGER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,059,607. Specification of Letters Patent. Patented Apr. 22, 1913.

No Drawing. Application filed April 26, 1912. Serial No. 693,444.

*To all whom it may concern:*

Be it known that I, ALEXANDER HAMBURGER, doctor of philosophy, chemist, citizen of the German Empire, residing at Elberfeld, Germany, have invented new and useful Improvements in New Vat Dye, of which the following is a specification.

My invention relates to the manufacture and production of new anthraquinone derivatives which are valuable vat dyestuffs.

The process for the production of the new compounds which are most probably coerthionium compounds consists in treating dianthraquinonylthioethers with condensing agents. The simplest of these compounds, that obtainable from the unsubstituted ether, has probably the following graphically represented formula:

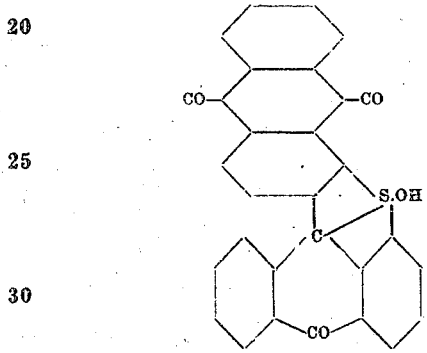

The new products are after being dried and pulverized from yellow to black powders soluble in concentrated sulfuric acid generally with from a brown to red to blue to green coloration; dyeing cotton from the vat from yellow to brown to violet to green shades.

In order to illustrate the new process more fully the following example is given, the parts being by weight:—10 parts of 5.5'-dibenzoyldiamino - 1.1'-dianthraquinonylthioether are introduced into 100 parts of monohydrated sulfuric acid at 10–20° C. and the resulting mixture is stirred at the ordinary temperature until the coloration brown in the beginning has turned blue. When the coloration does no longer change the sulfate of the new product is precipitated by the addition of sulfuric acid of 60° Bé. It is filtered off and washed with water. The new compound is a reddish-yellow crystalline powder soluble in monohydrated sulfuric acid with a pure blue coloration. It is insoluble in quinolin and yields a reddish-brown hydrosulfite vat from which cotton is dyed in yellow fast shades.

The product obtained from the 4.4'-dibenzoyldiamino-derivative dyes cotton in fast brown shades.

When the reaction is carried out at a higher temperature one or two benzoyl groups are split off. From the 5.5'-dibenzoyldiamino-1.1'-dianthraquinonylthioether a product is thus obtained which dyes cotton in brown-red shades. That obtained from 4.4'-dibenzoyldiamino derivative dyes reddish-blue.

Other of the above mentioned parent materials *e. g.* monosubstituted alpha-alpha- or alpha-beta-thioethers or the ethers themselves can be used.

I claim:—

The herein described new derivatives of thioethers of the anthraquinone series being most probably coerthionium compounds of the anthracene series, which are after being dried and pulverized from yellow to black powders soluble in concentrated sulfuric acid generally with from a brown to red to blue to green coloration; dyeing cotton from the vat from yellow to brown to violet to green shades, substantially as described.

In testimony whereof I have hereunto set my hand in the presence of two subscribing witnesses.

ALEXANDER HAMBURGER. [L. S.]

Witnesses:
HELEN NUFER,
ALBERT NUFER.